March 26, 1968 D. C. HUGHES 3,375,054

CARTRIDGE TYPE SOUND MOTION PICTURE PROJECTOR

Filed Dec. 11, 1964

9 Sheets-Sheet 1

INVENTOR.
DAVID COLSON HUGHES
BY
ATTORNEY

INVENTOR.
DAVID COLSON HUGHES
BY [signature]
ATTORNEY

March 26, 1968 D. C. HUGHES 3,375,054

CARTRIDGE TYPE SOUND MOTION PICTURE PROJECTOR

Filed Dec. 11, 1964 9 Sheets-Sheet 3

INVENTOR.
DAVID COLSON HUGHES

BY Michael Ebel

ATTORNEY

March 26, 1968 D. C. HUGHES 3,375,054

CARTRIDGE TYPE SOUND MOTION PICTURE PROJECTOR

Filed Dec. 11, 1964 9 Sheets-Sheet 4

INVENTOR.
DAVID COLSON HUGHES
BY Michael Ebert
ATTORNEY

CARTRIDGE TYPE SOUND MOTION PICTURE PROJECTOR

Filed Dec. 11, 1964 9 Sheets-Sheet 5

INVENTOR.
DAVID COLSON HUGHES
BY Michael Ebert
ATTORNEY

March 26, 1968 D. C. HUGHES 3,375,054

CARTRIDGE TYPE SOUND MOTION PICTURE PROJECTOR

Filed Dec. 11, 1964 9 Sheets-Sheet 6

INVENTOR.
DAVID COLSON HUGHES
BY [signature]
ATTORNEY

March 26, 1968 D. C. HUGHES 3,375,054

CARTRIDGE TYPE SOUND MOTION PICTURE PROJECTOR

Filed Dec. 11, 1964

9 Sheets-Sheet 7

INVENTOR.
DAVID COLSON HUGHES
BY [signature]
ATTORNEY

INVENTOR.
DAVID COLSON HUGHES
BY [signature]
ATTORNEY

March 26, 1968 D. C. HUGHES 3,375,054

CARTRIDGE TYPE SOUND MOTION PICTURE PROJECTOR

Filed Dec. 11, 1964 9 Sheets-Sheet 9

INVENTOR.

BY DAVID COLSON HUGHES

Michael Ebert

ATTORNEY

1

3,375,054
CARTRIDGE TYPE SOUND MOTION PICTURE PROJECTOR

David Colson Hughes, White Plains, N.Y., assignor, by mesne assignments, to Bohn Benton Inc., New York, N.Y., a corporation of New York Filed Dec. 11, 1964, Ser. No. 417,760
30 Claims. (Cl. 352—29)

ABSTRACT OF THE DISCLOSURE

A sound motion picture projector which is cartridge loaded, including a projector mechanism and a foldable rear screen assembly contained within a readily portable carrying case.

This invention relates generally to motion picture projectors for films having a sound track, and more particularly to a highly compact, self-sufficient and portable sound motion picture projector system wherein the film is in the form of a continuous loop contained in a cartridge and the projector is adapted automatically to engage and optically to project the film frames onto a screen and automatically to engage and play back the sound track.

In a conventional motion picture projector system, the film strip is wound about a supply reel. To project the film, the supply reel must first be mounted on a spindle, and the film is then threaded through an elaborate path in the projector, including sprockets, pressure plates, guides, and a film gate, the end of the threaded film being inserted in a take-up reel mounted on another spindle. In the course of projection, the film is advanced intermittently through the film gate, and as it unwinds from the supply reel it is wound about the take-up reel. Upon completion of projection, the operation is reversed and the film is rewound on the supply reel.

The use of projectors is no longer limited to motion picture theatres where trained operators are available. Increasingly, sound movie projectors are employed in the home, in schools, and for industrial and sales presentation purposes. In these situations, the projector may be placed in the hands of salesmen, students, teachers, prospective buyers and other relatively inexperienced operators who usually have great difficulty in properly threading the film and in otherwise operating the projector. Moreover, such operators normally begrudge the time required to go through the elaborate procedures necessary to operate the standard projector.

While various attempts have been made to simplify the threading of film in a projector, existing projectors still require a fair degree of skill and time to operate correctly, and unless the film is carefully threaded and properly handled, it may become mutilated or destroyed.

Conventional film projectors for eight and sixteen mm. film, even of the so-called portable type, are somewhat cumbersome and cannot be set up or operated easily, particularly where a separate screen is required. This is a serious disadvantage, for when a sales representative approaches a prospect and makes use of film projection to illustrate features of his product, his effectiveness is impaired should it become necessary for him to struggle with his projector and to keep his audience waiting while he attempts to thread the film and adjust the position of the screen.

Accordingly, a major object of the present invention is to provide a sound motion picture projector which is self-sufficient and which may be easily operated by unskilled personnel, without the need to thread film or to carry out other complex and time-consuming film handling operations.

2

Another important object of the invention is to provide a projector wherein the film to be projected may be changed in a matter of seconds merely by removing one cartridge thereof and inserting another. This capability is of great value in the fields of teaching and sales presentation where it is desirable to change subject-matter without delay. For prolonged presentations lasting an hour or longer and running sevearl reels, this ability to switch rapidly from one reel to the next is particularly useful.

It is also an object of the invention to provide a sound projector of the above type, wherein the sound film is in the form of an endless loop contained in a cartridge which is insertable into the projector, whereby upon completion of a film presentation, the film is then automatically aligned for a repeat sound and film presentation without the need for rewinding or any other adjustment.

A significant feature of the invention resides in the fact that after the film cartridge is loaded into the projector, by a single control action which places the projector in the "run" mode, the cartridge is operatively linked with the following projector components:

(a) the mechanical elements for advancing the film;
(b) the optical element for projecting the image frames onto a screen;
(c) the electromagnetic elements for pickup of the sound track on the film.

Yet another object of the invention is to provide a highly compact projector which may be housed in a relatively small carrying case having a hinged cover and incorporating a collapsible screen assembly, such that when the cover is raised, the screen may be quickly erected. Thus the projector may be carried without difficulty, and the operator is required when making the presentation, merely to open the cover to set up the screen, after which he simply inserts the film cartridge and turns a control dial to put the projector into operation.

Another feature of the invention resides in the use of a floating film gate which is incorporated in the cartridge and which when the cartridge is loaded in the projector, comes to rest on the base of an optical stand, whereby the orientation of the gate and the film therein relative to the lens system of the projector is always the same regardless of minor variations in the dimensions or position of the cartridge which otherwise would throw the film plane out of focus.

For a better understanding of the invention, as well as other objects and further features thereof, reference is made to the following detailed description to be read in conjunction with the accompanying drawings, wherein.

Figure 5:
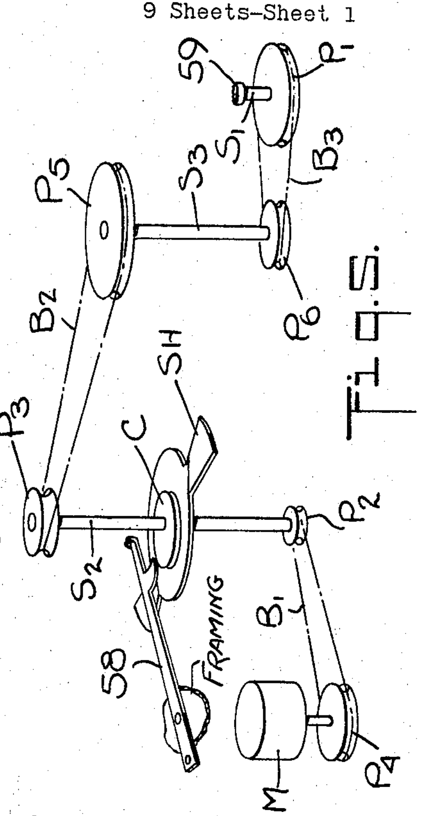
Figures 4, 10:
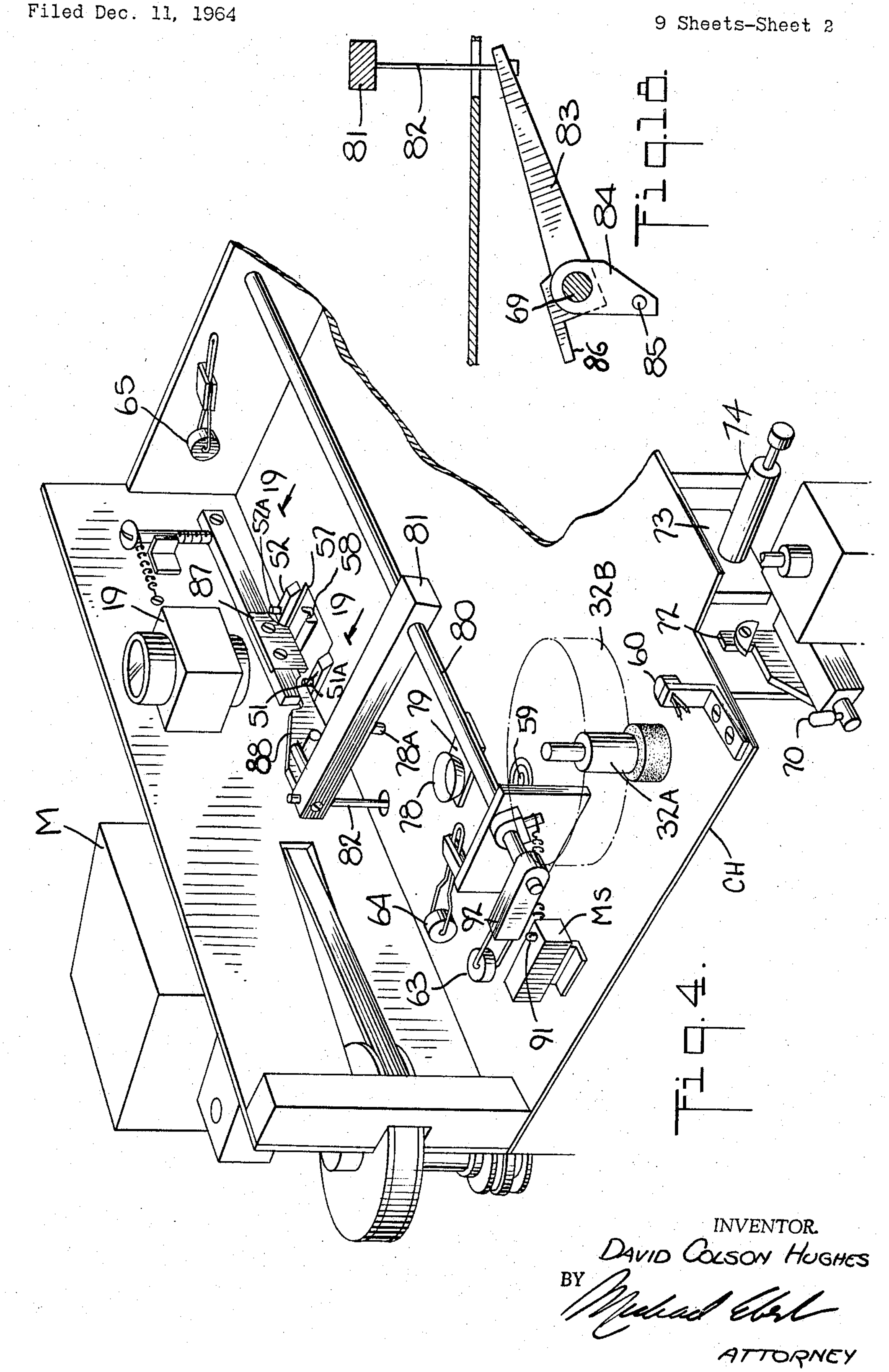
FIG. 4 is a perspective view showing mechanical details of a portion of the projector mechanism which accommodates the film cartridge.
Figures 6, 7, 8:
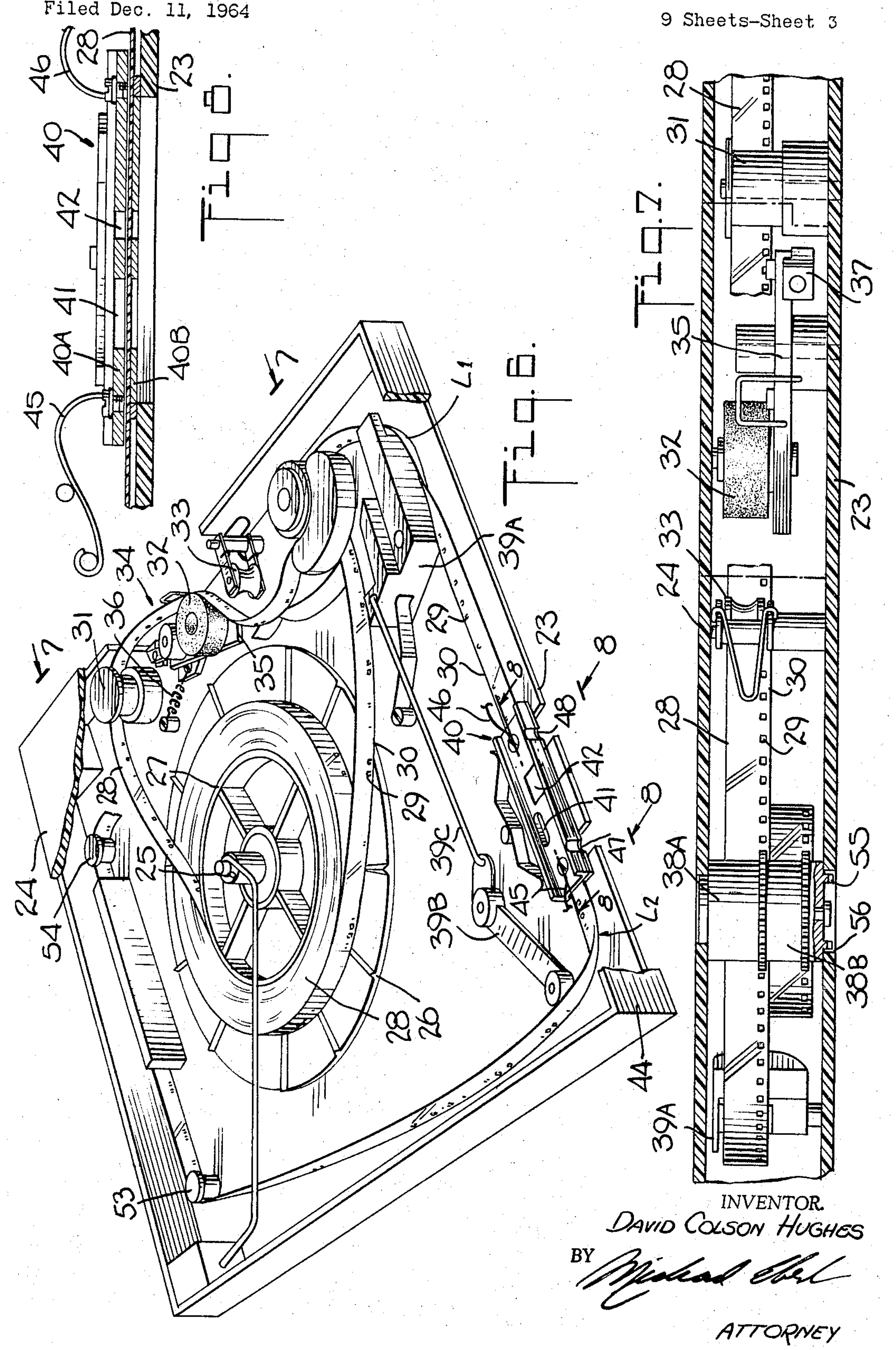
Figure 9:
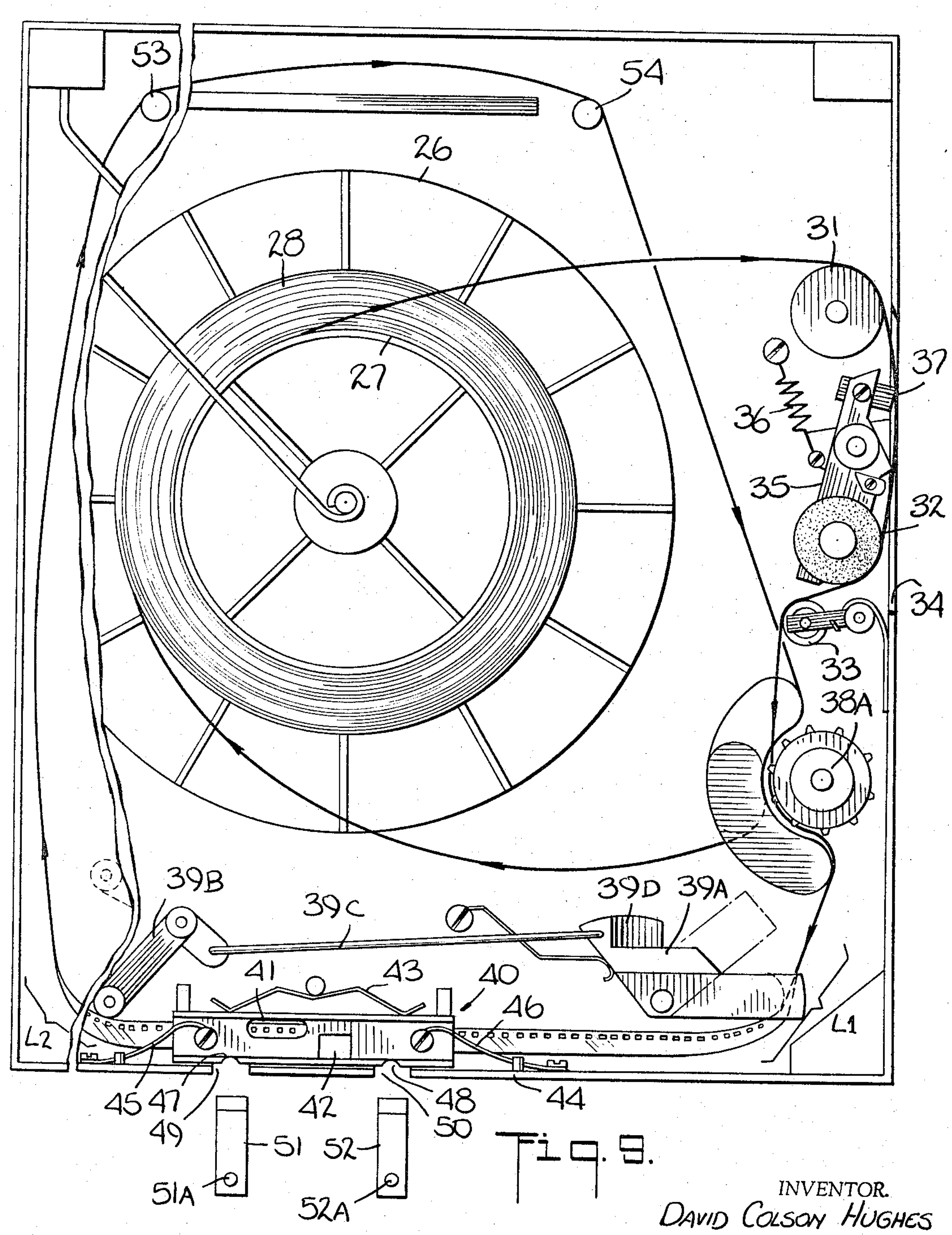
Figures 10, 13, 14, 15:
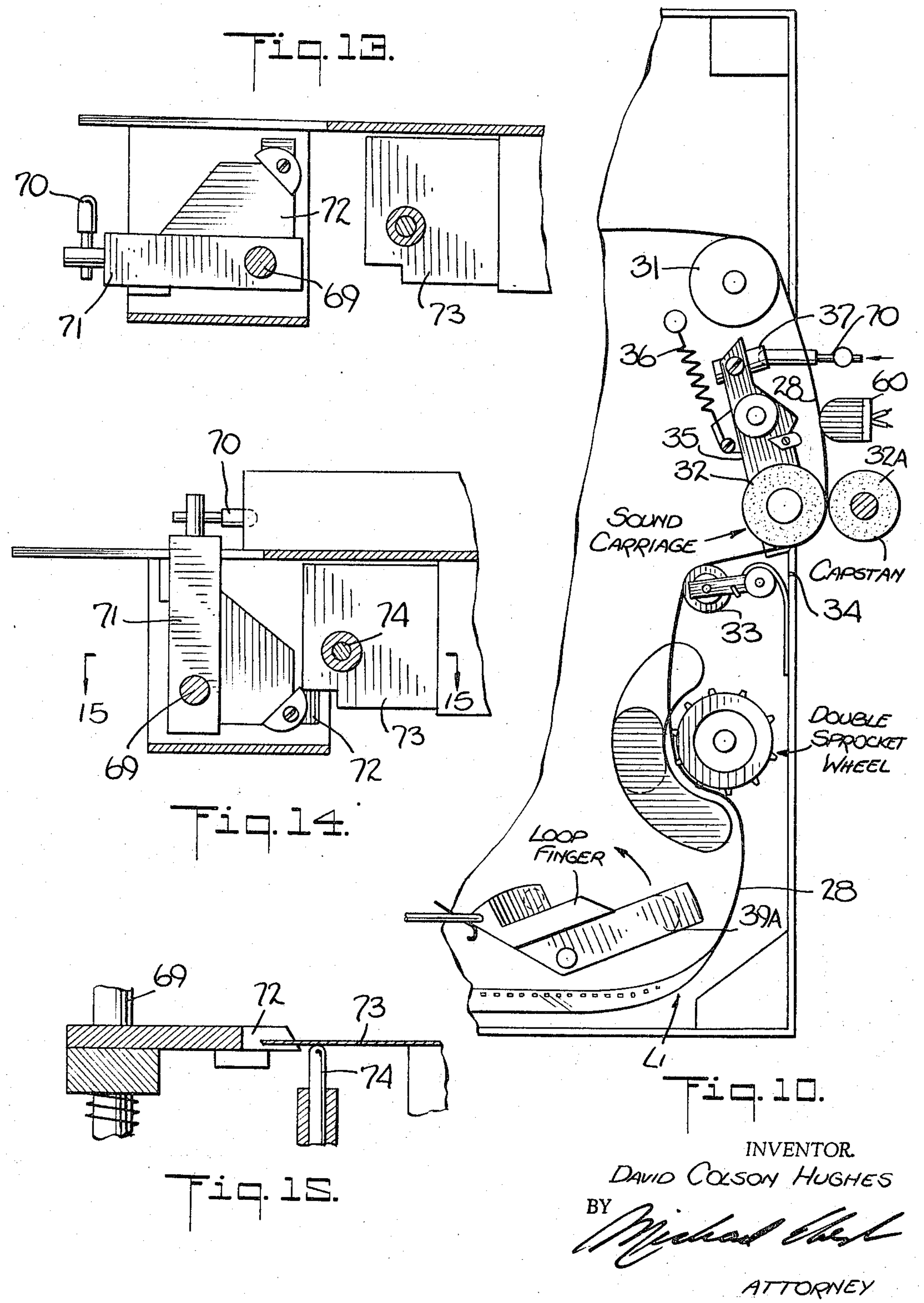
Figures 11, 23:
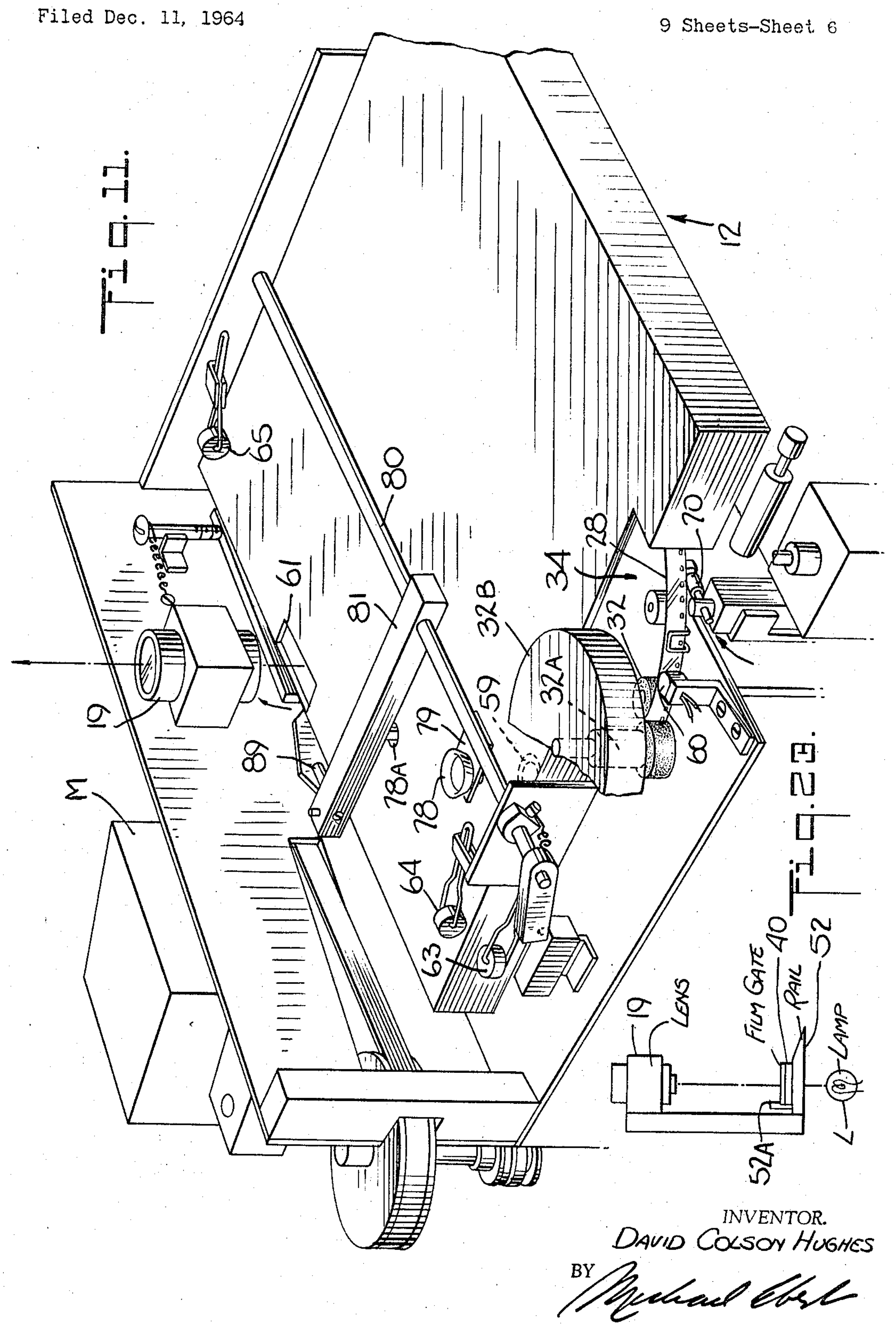
Figures 12, 19, 20:
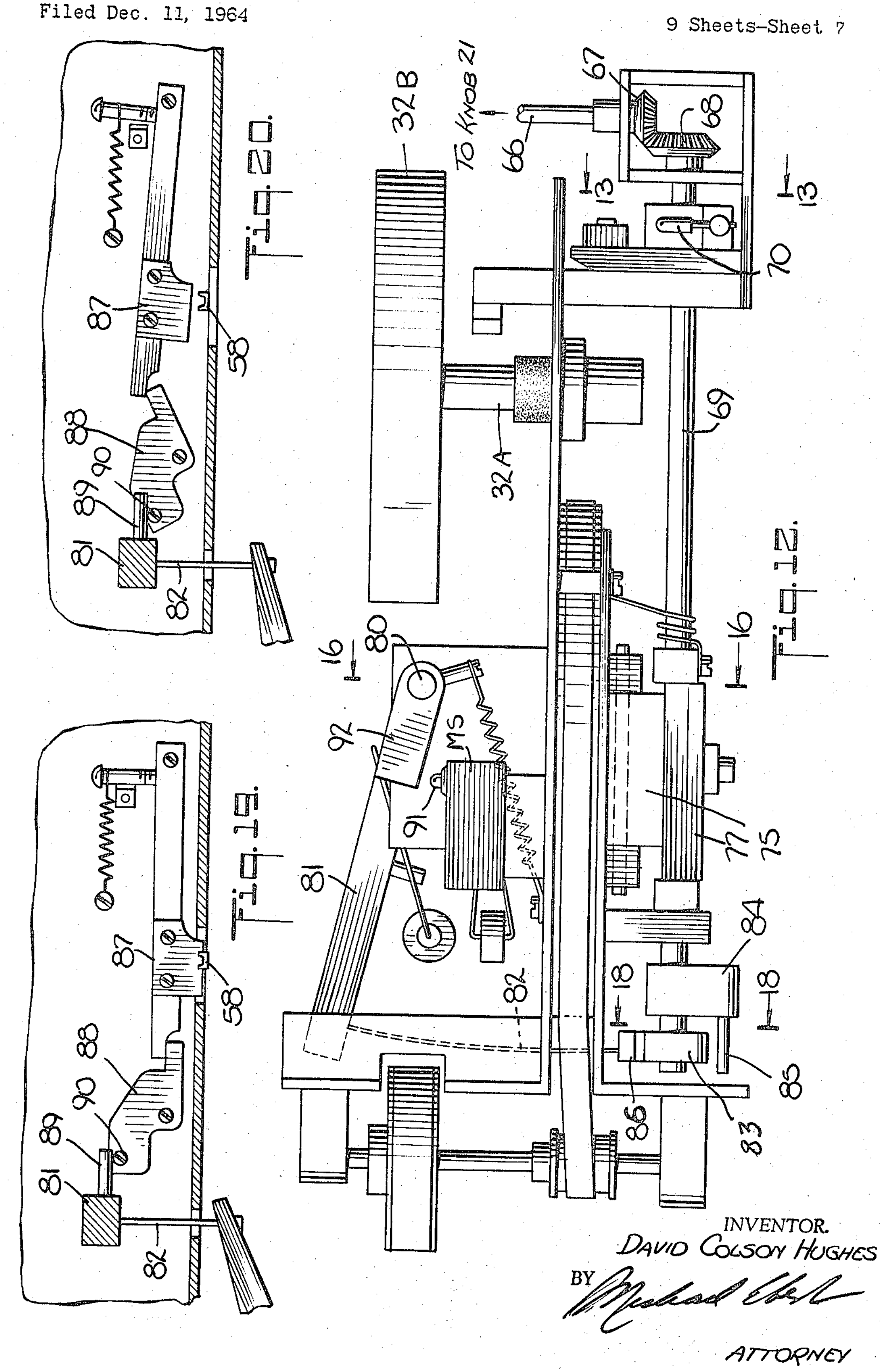
Figure 16:
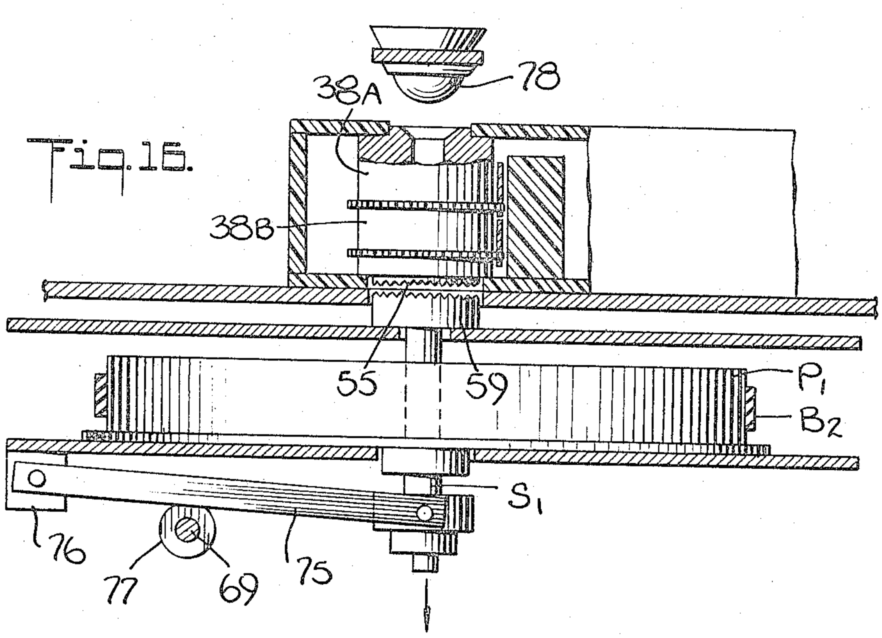
Figures 17, 21, 22:
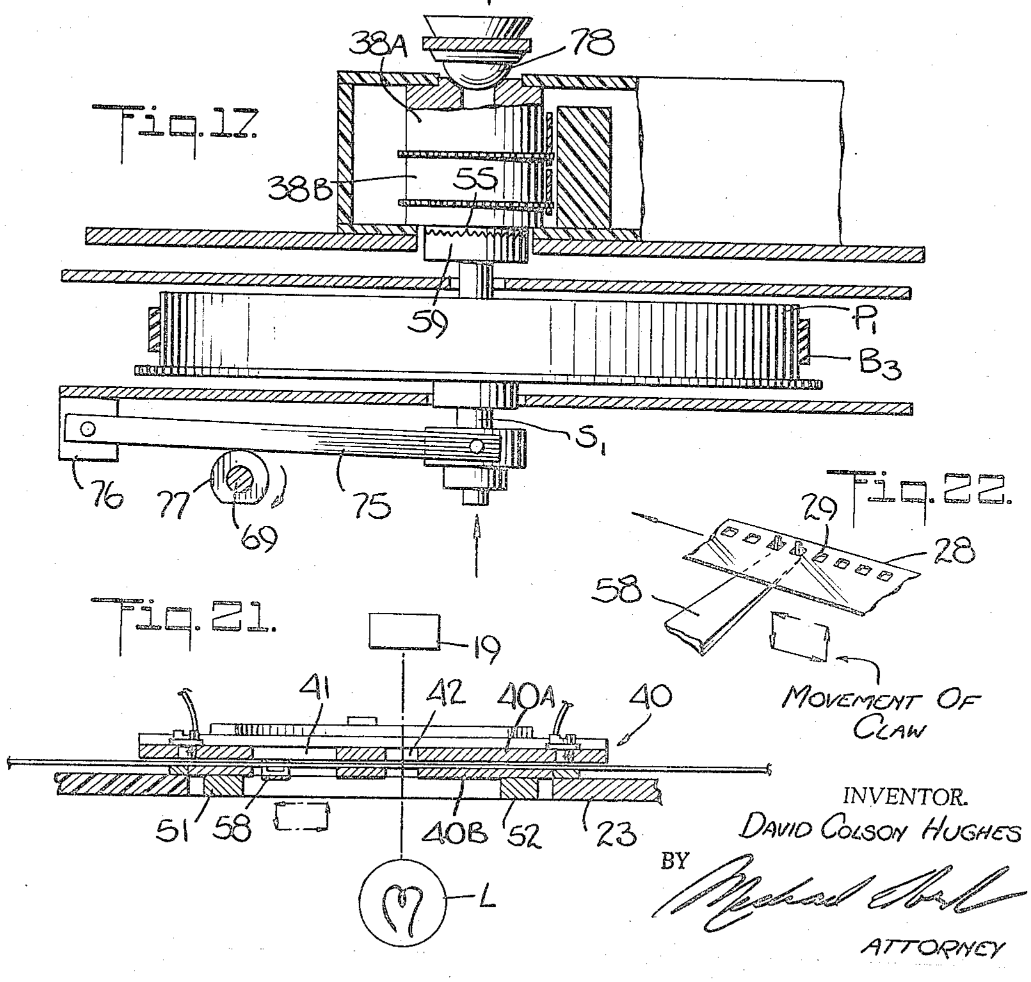
Figures 24, 25:
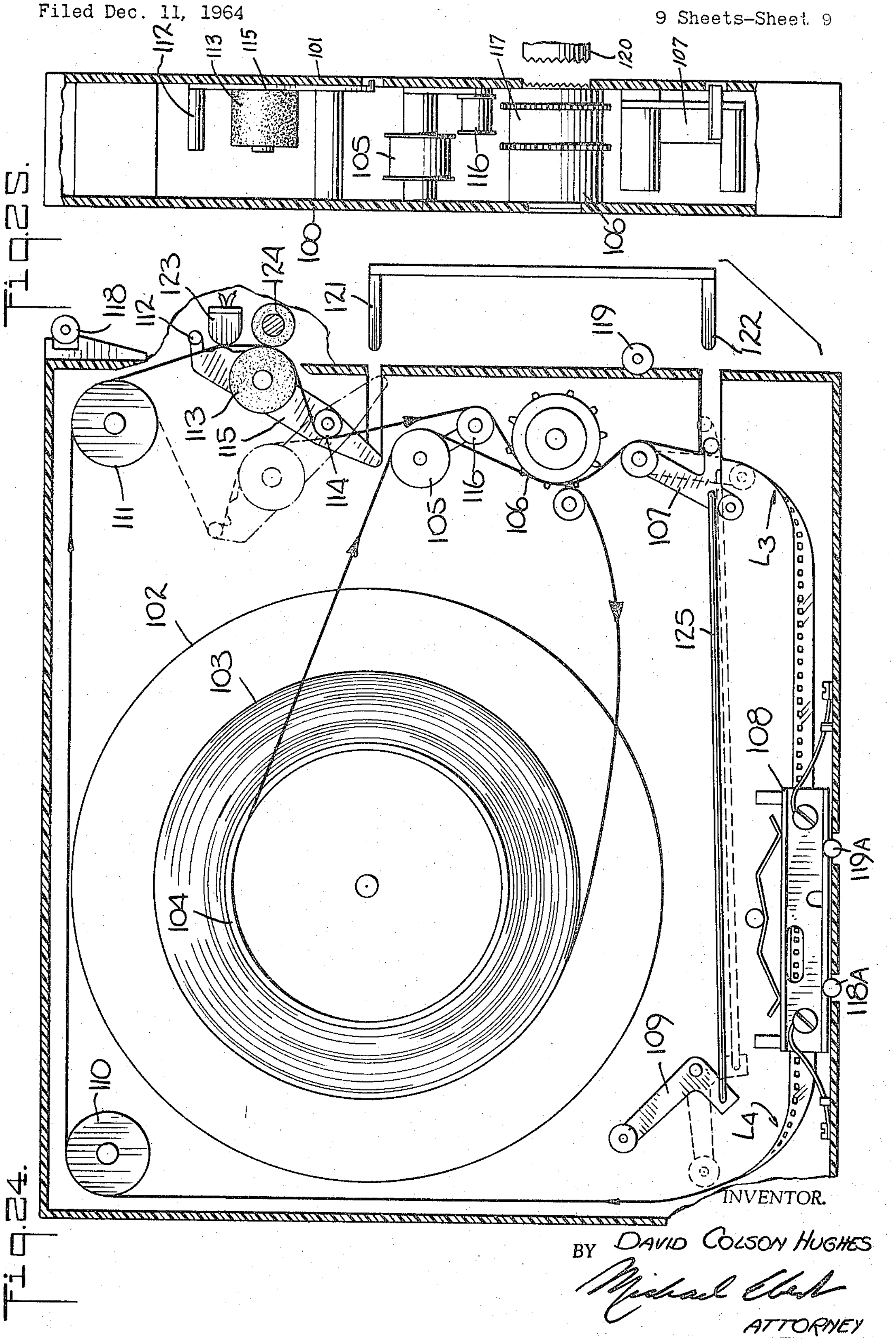

FIG. 5, in perspective shows the motor and pulleys coupled thereto for driving the shutter and the pull-down claw for advancing the film frames, and timing belts for rotating the film sprocket wheel;

FIG. 6 is a perspective view of the film cartridge, with the casing thereof partly broken away to reveal the various components contained therein;

FIG. 7 is a section taken in a plane indicated by line 7—7 in FIG. 6, and showing the double-deck sprocket wheel for driving the film as well as the sound track carriage;

FIG. 8 is a section taken in a plane indicated by line 8—8 in FIG. 6, and showing details of the film gate;

FIG. 9 is a plan view of the film cartridge, with the top of the cartridge casing almost entirely cut away;

FIG. 10 is a fragmentary plan view of the film cartridge, when the projector operates in the "run" mode, in which mode the sound carriage causes the sound track of the film to engage a magnetic pick-up head;

FIG. 11 is the same as FIGURE 4, except that in this instance the cartridge is shown loaded into the projector, and the film sound track is shown in engagement with the magnetic pick-up head by reason of the carriage operation illustrated in FIG. 10;

FIG. 12 is an end view of the projector mechanism and illustrates the mechanical details of the control system for placing the projector in the "run" mode or in the "stop" mode;

FIG. 13 is a section taken in the plane indicated by lines 13—13 in FIG. 12, and shows the means by which the push pin which actuates the sound carriage in the cartridge is operated and latched in place;

FIG. 14 is the same as FIGURE 13, but shows the push pin in its latched position;

FIG. 15, which is taken in the plane indicated by line 15—15 in FIG. 14, is a section taken through the push-pin latching device;

FIG. 16 is a section taken in the plane indicated by line 16—16 in FIG. 12, and illustrates the clutch or drive mechanism for operating the sprocket wheels in the cartridge, the clutch or drive being shown fully disengaged;

FIG. 17 is the same as FIG. 16, except that the clutch or drive is shown in the engaged condition;

FIG. 18 is a section taken in the plane indicated by line 18—18 in FIG. 12, and shows the crank mechanism for causing a bearing to engage the upper end of the sprocket wheel;

FIG. 19, which is a section taken in the plane indicated by line 19—19 in FIGURE 4, shows the control mechanism for disengaging the film-advancing claw when the projector is placed in the "stop" mode;

FIG. 20 is the same as FIGURE 19, except that the mechanism is shown in the raised position to engage the claw for the "run" mode;

FIG. 21 is a longitudinal section taken through the film gate, showing the claw in engagement with the film sprocket holes and the projector beam passing through film frames in the gate;

FIG. 22 separately shows in perspective the claw tip in engagement with the film sprocket holes;

FIG. 23 schematically shows in side view the position occupied by the floating film gate on the optical stand within the projector when the cartridge is loaded therein;

FIG. 24 is a plan view of a modified form of cartridge in accordance with the invention; and FIG. 25 is a side view of the modified cartridge.

*General description*

Figure 3:
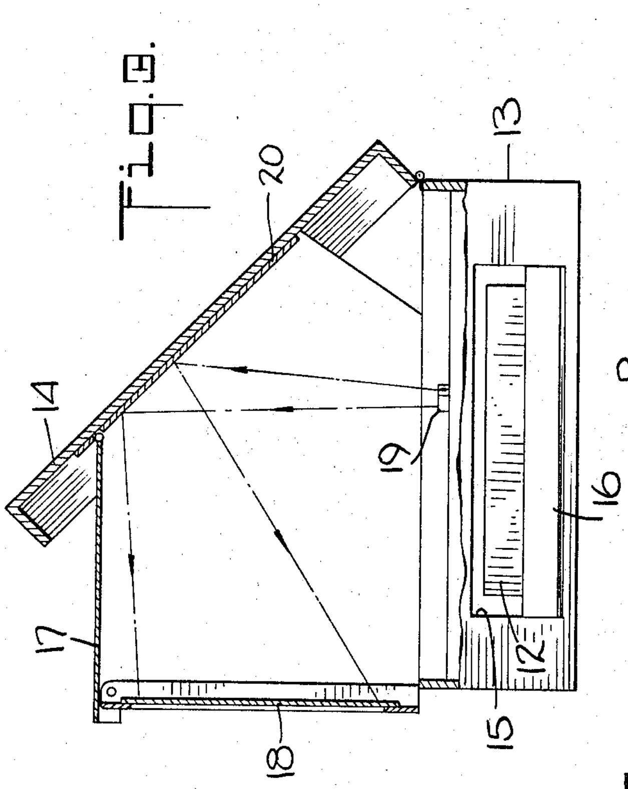
FIG. 3 is a transverse section taken substantially along the line 3—3 in FIG. 2, and illustrating the optical arrangement of the screen.
Figure 1:
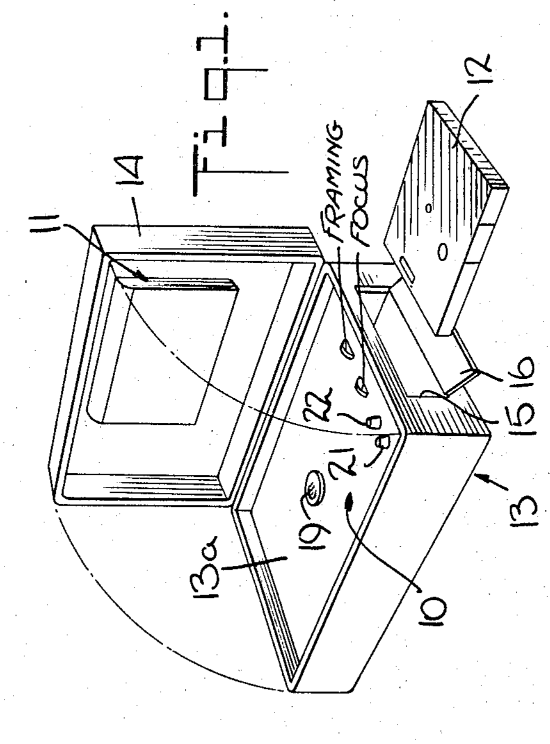
FIG. 1 is a perspective view of a carrying case containing a projector assembly in accordance with the invention, the figure depicting the cartridge withdrawn from the assembly and the collapsible screen folded away within the cover of the case.
Figure 2:
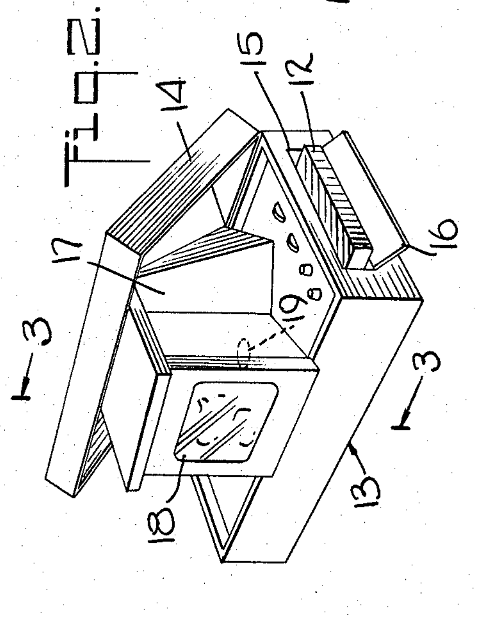
FIG. 2 is a perspective view showing the same projector assembly but with the cartridge partially inserted and the screen erected.

Referring now to the drawings, and in particular to FIGS. 1, 2 and 3, there is shown a preferred embodiment of a sound motion picture projection system in accordance with the invention, the main components being a projector mechanism generally designated by numeral 10, a collapsible screen assembly 11, and a film cartridge 12. Projector mechanism 10, which includes film-advancing components and optical elements, as well as a sound pick-up and an audio amplifying system for the film sound track, is installed in a small carrying case 13.

As best seen in FIG. 1, the entire projector mechanism lies below the horizontal panel **13*a* on which appears only the opening for the projector lens and the various control knobs. The case is provided with a hinged cover 14 in which the screen assembly 11** is mounted.

Cartridge 12 is inserted into the projector through a slot 15 cut in one end of the casing, and when the projector is not in use, the slot is closed by a hinged flap 16. Since the cartridge, when fully inserted, does not extend outside of the casing, it may be carried within the casing ready to run.

Screen assembly 11 is composed of a folding light shield 17 on the front of which is attached a rectangular translucent screen plate 18 suitable for motion picture presentation, a reflecting mirror 20 being secured to the interior wall of cover 14. When the screen assembly is collapsed, it lies against cover 14, as shown in FIG. 1, but when the assembly is erected, the screen plate 18, as shown in FIGS. 2 and 3, stands in a vertical position somewhat forward of the front casing 13. Film images projected through a lens barrel 19 are cast upwardly onto reflecting mirror 20 and are directed thereby onto the translucent screen 18, as indicated by the arrows in FIG. 3.

To operate the projector, one has merely to insert the cartridge 12 in slot 15 and then turn the control knob 21 on the top panel of projector 10 to put the projector in the "run" mode. As will be explained later in detail, the turning of knob 21 acts to bring about engagement between the film sprocket wheel and the drive mechanism therefor, as well as engagement of the film advance claw which is automatically aligned, and also engagement between the magnetic sound track and the pick-up system therefor. All that the operator need do after turning on the projector, is to adjust the sound volume of the amplifier by means of a knob 22, and if necessary, focus and frame the image by means of control dials.

Inasmuch as the audio amplification system, which is preferably transistorized for compactness, is entirely conventional, it will not be described herein, except to note that it too, as well as the loudspeaker, is included in casing 13.

In film cartridge 12, which as shown in FIG. 1 lies in the horizontal plane, an endless film is wound about the reel hub of a turntable, the film on the reel being disposed in the vertical plane. However, since the optical projection path is along a vertical axis, the cartridge arrangement must be such as to pass the normally vertical film from the reel through a horizontally disposed film gate. The advantage of this arrangement is that it then becomes possible to design a projector apparatus that can be accommodated within the limited space available within casing 13 and to exploit the space defined by the inclined open cover to provide an extended optical path for producing an image of adequate size despite the over-all compactness of the total assembly. In practice, the casing can be as small as 15 inches in length, 11½ inches in width, and 3⅞ inches in depth.

It is to be understood that the projector system in accordance with the invention may be installed in other forms of housings which are not necessarily either collapsible or portable. The primary advantages of the invention lie in the cartridge arrangement, which makes it possible to operate the instrument simply by loading cartridges therein. For example, a full-length motion picture running two hours can be presented by furnishing the operator with the appropriate number of cartridges which he then loads in proper sequence into the projector with an elapsed interval of only two or three seconds between the projection of the last frame of the preceding cartridge and the first frame of the succeeding cartridge.

*The film cartridge*

The cartridge, generally designated by numeral 12, is shown in detail in FIGS. 6 through 10. The cartridge is constituted by a rectangular casing formed of a suitable plastic material and having a bottom wall 23 and a top wall 24. Rotatably mounted on a spindle 25 is a ribbed turntable 26 having a hub or central reel 27 about which is wound an endless coil of film 28. Film 28 has the usual image frames and is provided along one edge with longitudinally extending sprocket holes 29. The film also carries along the same edge, a magnetic sound track 30. It is to be understood, however, that the magnetic sound track may be, in practice, placed along the opposing edge of the film.

The film coil 28 is unwound from the inside, the innermost convolution leaving the hub 27, the film returning to the coil at the outermost convolution. As the endless film coil is unwound it is simultaneously rewound, and upon completion of a full run, the film is in position for the next run.

The film leaving hub 27 travels around a guide roller 31, a carriage or pinch roller 32, and a spring-loaded mechanical filter guide roller 33. A sound track opening 34 is cut into the side wall of the cartridge adjacent rollers 31 and 32, the film being conducted by the rollers along this opening. Roller 32 is mounted on one end of a pivoted carriage 35 which is biased by a spring 36 which acts to retract the roller 32 from the opening 34. Attached to the other end of the carriage is an actuating arm 37 which when pushed in a manner to be described later, causes the carriage or pinch to swing, whereby carriage roller 32 is protruded through the opening 34 in the cartridge and brings the film riding thereon into engagement with an external capstan 32A above which is a flywheel 32B, the flywheel (note FIG. 4) acting to smooth the movement of the film which is subjected by the sprocket wheel to a pulsatory motion. A portion of the film extending between rollers 31 and 32 engages the pick-up head 60 which responds to the sound track thereon.

From roller 33, film 28, as indicated by the directional arrows in the figures, travels to a sprocket wheel assembly having an upper deck 38A and a lower deck 38B, both decks being keyed to a common shaft, the film sprocket holes 29 being engaged by the upper-deck. The film passing through the sound carriage and the sprocket wheel, lies in a vertical plane normal to the bottom and top walls of the cartridge, but when leaving the sprocket wheel 38A and passing around a pivoted and spring-loaded loop finger 39A forming a loop $L_1$, it makes a 90-degree twist, so that it then lies parallel to the bottom wall 23 of the cartridge in a position to enter a projection gate assembly 40 in the horizontal plane.

Gate assembly 40 is formed of two interfitting plate-like pieces 40A and 40B between which the film passes. It is provided with an elongated slot 41 which exposes the sprocket holes 29 on the film passing therethrough, whereby an external claw arm may engage the sprocket holes to advance the film intermittently. Also cut into gate assembly 40 is a window 42 through which the image frames on the film are optically projected.

The gate assembly is floatably mounted by a leaf spring 43 which urges the gate forwardly against the front wall 44 of the cartridge, and springs 45 and 46 which urge the gate downwardly against the cartridge bottom wall 23. As best seen in FIG. 9, the forward end of the gate assembly has notches 47 and 48 cut therein which lie adjacent to cut-outs 49 and 50 extending inwardly in the front wall and bottom of the cartridge casing to permit entry of a pair of tapered rails 51 and 52 which are external to the cartridge and which are aligned with cut-outs 49 and 50.

Thus when the cartridge is loaded into the projector, the floating gate 40 is raised by the rails 51 and 52 to bring the film therein into registration with the optical system. Proper registration is maintained by means of guide pins 51A and 52A when these are received within the notches 47 and 48.

From the gate, the film returns to the vertical plane and passes around loop finger 39B forming a loop $L_2$, then along guide posts 53 and 54, from which it is then conducted through the lower deck 38B of the sprocket wheel, this wheel controlling the rate at which the film is returned to the outermost convolution of the coil on the turntable. The film, after leaving gate 40, is therefore payed out and returned to the turntable 26 by the action of the lower sprocket wheel 38B at precisely the rate necessary to maintain the loops $L_1$, $L_2$.

The spring-loaded loop fingers 39A and 39B are intercoupled by a wire link 39C, such that when a vertical pin, to be later described, is brought down on the cam surface 39D on finger 39A, the two loop fingers are both caused to swing into the retracted positions shown in dotted lines, so as to free the loops of film $L_1$ and $L_2$. The rate of sprocket rotation is such that one frame of film is fed to the free loop $L_1$ for each frame drawn into the gate by the claw and for each frame discharged from the gate into free loop $L_2$. Thus the loops $L_1$ and $L_2$ remain constant.

At the end of a run, the free loops $L_1$ and $L_2$ might then have increased or decreased from their respective optimum sizes because the claw may have engaged a frame too late or too early. The accumulation of this error over a series of run cycles will render the system inoperative in that the loop $L_2$, if the claw engaged too late, and the loop $L_1$, if the claw engaged too early, would then be so tight as to rupture the film. This drawback is obviated by the action of the spring-loaded fingers 39A and 39B, which at the conclusion of each run cycle when the actuating pin (78A in FIG. 4) is withdrawn, automatically return to the stop-mode position and thereby reestablish the proper loop dimensions, thus assuring that the free loops $L_1$ and $L_2$ remain within the acceptable size at all times.

Rotation of the sprocket wheel is effected by means of a female toothed clutch element 55 (FIG. 16) attached to the end of the shaft on which the upper and lower deck sprockets 38A and 38B are mounted, access to the clutch element 55 being had by means of an opening 56 in the bottom of the cartridge.

It is to be noted that the portion of the film being acted upon in film gate 40 (and in the modified cartridge shown in FIGS. 24 and 25 at the sound head also) is within that length of film which lies between the upper and lower sprocket of the double-decked sprocket wheel, and that this length, which is hereafter referred to as the "operating length" of the film, is maintained constant by the double-decked sprocket wheel.

Thus the main elements of the film cartridge are a turntable for the film coil, a double-decked sprocket wheel for simultaneously unwinding the film and rewinding the film on the turntable and at the same time maintaining a fixed film length between the entry of the film on the upper deck of the sprocket and the departure of the film at the lower deck of the sprocket loop fingers to reestablish the dimensions of the free film loops on either side of the film gate, a retractable sound carriage adapted to bring the film track into engagement with an external sound head, a film gate assembly having a window through which the film frames are optically projected, and a slot for accommodating an external claw which engages the sprocket holes to advance the film frame by frame through the projection window, and the female elements of the system that provide registration of the film plane with the optical system.

*Loading of cartridge in projector*

In the previous sections, a cartridge is described having a double-sprocket wheel for winding and unwinding the endless film, the sprocket wheel being provided with a female clutch element. Also included in the cartridge is a sound carriage adapted to extend the sound track on the film through an opening in the cartridge. The cartridge further incorporates a film gate having a slot to receive a claw for engaging the sprocket holes of the film to advance the film frame by frame, as well as a window through which the frames are optically projected. Also included are loop fingers to reestablish the dimensions of the free loops after each run and the female elements of the system that registers the film plane with the optical system.

We shall now show, with reference to FIGS. 4 and 11, those projector elements which cooperate with the above-identified components of the cartridge. In FIG. 4, in which the projector is shown before the cartridge is inserted, it will be seen that the projector chassis CH has a cut-out 57 therein through which a projection light is cast upwardly through the gate in the cartridge, into the projection lens 19. Within this cut-out is a claw arm 58 which is adapted to engage the film through the slot in the gate of the cartridge.

Rotation of the sprocket wheel is effected by means of a male clutch or drive member 59 which engages the female clutch or drive member 55 (see FIG. 17) in the cartridge. Sound pick-up is effected by means of a magnetic pick-up head 60 mounted on a bracket above the chassis.

When the cartridge 12 is inserted, as shown in FIG. 11, it assumes a position whereby the cut-out portion 61 thereof, which exposes the film gate, lies in registration with the cut-out 57 to permit the passage of light through the film gate into lens barrel 19, as shown by the vertical arrow. The male clutch member 59, when in the "run" mode, intermeshes with the female clutch member of the cartridge, whereas the film 28 is now pressed against the pick-up head 60, assuming, of course, that the cartridge is in the "run" mode and the carriage or pinch roller 32 is extended.

In order to cause the cartridge to occupy and remain in the desired position, spring-biased detent rollers 63, 64 and 65 are positioned to ride along the top wall and one side wall of the cartridge and to drop into suitable depressions therein.

As pointed out previously, when the cartridge is inserted, the downwardly-biased floating gate 40 rides over and is lifted by tapered rails 51 and 52, and is positioned thereon by locating pins 51A and 52A (FIG. 9). Thus, as shown schematically in FIG. 23, the orientation of the floating film gate relative to the lens 19 positioned above the rails is established by the rails and is independent of minor variations in the dimensions or position of the cartridge in which the gate is housed. In effect, therefore, the optical system is comparable to that of a microscope stand, and the film going through the gate is always properly aligned regardless of variable tolerances in the construction of the cartridges. Hence the focus of the optical system is maintained from cartridge to cartridge.

*The motor system*

As pointed out in the previous section, the two drive elements for the cartridge are a male clutch element 59 which engages the female clutch element connected to the double-decked sprocket wheel 38A and 38B, and a claw arm 58 which enters the film gate to engage the film sprocket holes in order to pull the film intermittently frame by frame.

The mechanism for carrying out these functions is shown separately in FIG. 5, in which it will be seen that the male clutch element 59 is mounted on the upper end of a vertical shaft $S_1$ whose lower end terminates in a timing pulley $P_1$. Claw arm 58, which is flexible, rests on the surface of a cam C mounted on a vertical shaft $S_2$ having pulleys $P_2$ and $P_3$ attached to opposing ends thereof. A shutter SH of conventional construction is also mounted on shaft $S_2$. Pulley $P_2$ is coupled by a belt $B_1$ to a pulley $P_4$ connected to the armature shaft of a constant-speed motor M, whereas timing pulley $P_3$ is coupled by a timing belt $B_2$ to a timing pulley $P_5$. Pulley $P_5$ is mounted on the upper end of a vertical shaft $S_3$ having a timing pulley $P_6$ attached to the lower end thereof, pulley $P_6$ being linked by a timing belt $B_3$ to a pulley $P_1$. The relationship of the timing belts and pulleys is such as to assure that one frame of film is fed to the free loop $L_1$ for each frame drawn into the film gate by the claw.

Thus when motor M is energized, cam C and clutch or sprocket drive 59 are both caused to rotate uniformly at relative speeds which are determined by the pulley ratios. The configuration of cam C is such that the claw 58 in the course of each full cam revolution is displaced along a rectangular path as indicated by the directional arrows in FIG. 21, such that when the projection light is shuttered the claw shifts in a horizontal direction to advance the film. The claw then drops vertically before shifting horizontally in the reverse direction, after which point it is raised vertically to its initial position where it again shifts in the horizontal direction to again pull the film. The extent of film advance is such as to bring a new frame into the window of the gate assembly. The operation of the claw arm, which includes the usual framing means, is entirely conventional.

The relationship between the claw 58 and the film 28 is best seen in FIGS. 21 and 22, which show the gate assembly 40 having a slot 41 therein to expose the sprocket holes 29 of the film and to accommodate claw 58. The length of the slot 41 is such as to permit the claw to move along the length thereof when cam C causes it to shift horizontally to thereby advance the film frames with respect to the window 42. When the shutter is open a light beam from source L is projected in axial alignment with projector lens 19. When the claw drops vertically, the sprocket holes are disengaged and the film frame remains in the window. A next advance does not occur until the claw is shifted in the reverse horizontal direction and is then brought up to engage the film.

*Mode selection*

As pointed out previously, there are two modes of operation, namely the "run" mode when the projector is operated, and the "stop" mode wthen the projector is inactive. Selection of the mode is made by the control knob 21 on the horizontal panel of the projector, as shown in FIG. 1. The mechanism operated by the knob is shown in FIG. 12, where it will be seen that knob 21 is keyed to a vertical shaft 66 coupled by bevel gears 67 and 68 to a main control shaft 69.

Operatively coupled to the main control shaft 69 is a pusher-pin 70 which when the knob 21 is turned to select the "run" mode, is shifted to engage the actuating arm 37 on the sound carriage. When the pusher-pin 70 presses in on arm 37, the carriage 35 is caused to swing, and, as best seen in FIG. 10, the roller 32 draws the sound track of film 28 into engagement with the pick-up head 60, the film being pressed against the capstan 32A to provide for smooth movement thereof.

The manner in which the pusher-pin 70 is actuated is shown separately in FIGS. 13, 14 and 15, where it will be seen that pin 70 is mounted on the end of an arm 71 extending from the main control shaft 69. Attached to the shaft is a cam plate 72 which is designed to cooperate with spring plate 73, such that when the shaft is rotated, as shown in FIG. 14, the cam plate interlocks with the spring plate. The pusher-pin is thereby latched in the "run" mode and can only be released by means of a release finger 74 which is adapted, as shown in FIG. 15, to press against the spring plate 73 and to deflect it to an extent permitting arm 71 to return to the "stop" position shown in FIG. 13.

The operation of the clutch to effect engagement between the sprocket wheel in the cartridge and the motor drive system, is shown in FIGS. 16 and 17. In FIG. 16, the male clutch element 59 of the sprocket drive is shown disengaged from the female clutch element 55 thereof. The timing pulley $P_1$ and the male element 59 are both mounted on the vertical shaft $S_1$, whose axial position is controlled by a lever 75 hinged at one end to shaft $S_1$, the other end of lever 75 being hinged to a fixed block 76. Keyed to the main control shaft 69 is a cam sleeve 77 having a flattened portion such that when the shaft is turned to the "run" mode position, as shown in FIG. 17, the round portion of the cam engages lever 75 to lift shaft $S_1$ and thereby cause the clutch elements 55, 59 to intermesh.

It will be noted that in FIGS. 16 and 17, there is also shown a bearing member 78 which in the "stop" mode is lifted above the upper end of sprocket 38A, while in the "run" mode it is brought down onto the cartridge to provide a bearing support for the sprocket wheel as the wheel is turned through the intermeshing clutch elements.

The bearing 78 is brought into play by a mechanism which also acts to engage the claw 58, and in this regard we refer back to FIG. 4, where it will be seen that bearing 78 is mounted on a short arm 79 extending laterally from a shaft 80. Also attached to shaft 80 and extending laterally therefrom is a crank bar 81 which is pulled down by a vertical wire 82 passing downwardly through an opening in the chassis CH.

When the crank bar is pulled down, shaft 80 turns counterclockwise to swing bearing 78 into place on top of the double-decked sprocket wheel 38A in the cartridge. Also mounted on the crank bar 81 is a pin 78A which, when the crank bar is pulled down, engages the cam surface 39D on the loop finger 39A (FIG. 9) causing both loop fingers 39A and 39 B to be retracted, and held, thus freeing loops $L_1$ and $L_2$ for operation in the "run" mode.

The manner in which wire 82 is manipulated to operate the crank is best seen in FIGS. 12 and 18, where it will we observed that freely mounted on the main control shaft 69 and extending therefrom, is a lever 83 to the end of which the wire 82 is attached. Keyed to shaft 69 is a tab 84 having a pin 85 attached thereto, the pin being disposed to strike a foot 86 protruding rearwardly from lever 83, such that when the control shaft 69 is rotated, pin 85 causes lever 83 to rotate clockwise and thereby pull down wire 82 to operate crank bar 81.

As shown in FIG. 4, claw 58 is ordinarily held down and disengaged by a spring-loaded and pivoted bar 87. In the "run" mode bar 87 is lifted by a pivoted finger 88 to release the claw 58 for engagement with the film. The manner in which this is accomplished can best be seen in FIGS. 19 and 20. It will be seen that crank bar 81 has a pin 89 projecting laterally therefrom, which pin extends over and is perpendicular to a pin 90 projecting from finger plate 88. Hence when the crank bar 81 is pulled down by wire 82, which occurs when the knob 21 is turned to the "run" mode position, finger 88 turns on its pivot and lifts bar 87 to release claw arm 58, in the manner shown in FIG. 20, to engage the film.

The electrical circuit for controlling the motor M, the light bulb B for the optical projector, as well as the audio amplifier, are controlled by a microswitch MS having an actuating button 91 (note FIGS. 4 and 12), which button is engaged by an arm 92 keyed to the end of shaft 80 when the shaft is turned by pulling down on crank arm 81.

Thus, shifting knob 21 from the "stop" to the "run" mode position causes the main control shaft 69 to rotate and to bring about in proper sequence the following actions:

(a) The claw 58 is released so that it is free to enter the slot in the film gate contained in the cartridge, and to engage the sprocket holes in the film and thereby advance the film frame by frame.

(b) The double-decked sprocket wheel 38A, 38B in the cartridge is engaged on the bottom by the drive clutch 59 and on the top by the bearing 78, thereby causing unwinding of the film from the turntable and concurrent rewinding of the film thereon.

(c) The pusher-pin 70 acts upon the sound carriage in the cartridge to bring the sound track into engagement with the pickup head 60.

(d) The pin 78A causes retraction of the loop fingers to free the loops $L_1$ and $L_2$.

(e) Microswitch MS is closed to electrically energize the motor M and the projector lamp L.

*Modified film cartridge*

Referring now to FIGURES 24 and 25, another preferred embodiment of a cartridge in accordance with the invention is shown, comprising a generally rectangular casing having a top wall 100 and a bottom wall 101, within which is mounted a turntable 102 having a coil of film 103 wound on the hub 104 thereof. The innermost convolution of film is unwound from the coil and passes over the coil and around the roller 105 and from there onto the upper deck 106 of a double sprocket wheel. Leaving the sprocket wheel, the film forms a free loop $L_3$ whose size is maintained by loop finger 107. At the forward end of the loop $L_3$, the film twists into the horizontal plane and enters the gate 108 which is formed, in the manner described in connection with the previous figures, by a pair of shaped metal plates spring-loaded together downward and forward in a recess in the bottom of the cartridge.

Leaving the gate, the film returns to the vertical plane and again forms a free loop $L_4$ whose size is maintained by a loop finger 109. At the end of this loop, a guide roller 110 causes the film to traverse the circumference of turntable 102, from which guide roller the film passes around roller 111. From this point, the film is guided around pin 112 and rollers 113 and 114 mounted on a pivoted carriage 115. Leaving this carriage, the film travels past the spring-loaded roller 116 and then enters the lower sprocket wheel 117 which controls the length of the operating loop before allowing the film to return to the outermost turn of the film coil on the turntable.

In loading, the cartridge is inserted into the projector with the gate end foremost and the sides guided in position until rollers 118 and 119 engage their respective detents. At this time, because of the action of stops 118A and 119A on tapered rails, as previously described, the top and bottom plates of gate 108 are aligned with each other and with the optical axis, and with the pull-down claw, the claw being still retracted below the cartridge level. The film in the gate is also, therefore, aligned with the claw and optical axis. Furthermore, because of the lifting action of the tapered rails, in the maner described in the previous figures, the film is held at the exact focus of the projection lens. Also at this time, the center of the sprocket wheel shaft is aligned with the center of the sprocket drive 120, and the openings in the cartridge are also aligned with ganged pins 121 and 122.

In operation, when the operating lever is turned to the "run" mode, pin 121 engages one end of sound carriage 115, causing it to rotate about pivoted guide 114 and to leave the position shown in dotted lines and to assume the position shown in the solid lines, in which position the film sound strip is aligned with the pick-up head 123, and the film is held firmly between the idler 113 and the flywheel capstan 124. At the same time, pin 122 pushes the loop finger 107 into the position shown in solid lines, thus forming the free loop $L_3$ on the input side of the gate, while linkage 125 causes the loop finger 109 to rotate, freeing the loop $L_4$ on the output side of the gate.

Also, when switched to the "run" mode, sprocket drive 120 rises to engage the teeth at the bottom of the sprocket wheel shaft, the claw is caused to engage the film sprocket holes, and a switch closes to operate the drive motor, the projection lamp, and sound amplifier, in the manner described previously.

In the cartridge shown in FIGS. 24 and 25, and in the cartridge shown in the other figures, the unevenness of sprocket action is smoothed by the flywheel capstan 124 in conjunction with a rubber pinch roller 113 on the carriage and a spring-loaded idler roller 116, so that the audio signal produced by the sound head is undistorted.

It is important to note that the length of the film as it leaves the upper deck of the sprocket wheel to the point at which it returns to the lower deck thereof is fixed and constant and it is this fixed length that permits loop fingers 107 and 109 to readjust the free loops $L_3$ and $L_4$ to their correct size. The length of the film traversing the sound carriage remains the same whether the carriage is in the run mode or in the stop mode.

The turntable is also driven so as to minimize tension on the film strip, this being accomplished by means which are not shown in that they are identical to those provided for the double-decked sprocket wheel.

It will be noted that while the cartridges shown in FIGS. 6 and 24 have minor differences in detail, and in the manner in which the film is guided through the operating components, the basic features are the same, in that they both make use of a double-decked sprocket wheel to take off and control the length of the operating loop of the endless film, they both employ a retractable sound carriage, a floating film gate which registers with the optical system and retractable loop fingers to reestablish the dimensions of the free film loops on either side of the film gate.

It is to be observed that in the projector system in accordance with the invention, the axes of the film turntable, the double-decked sprocket wheel, the shutter, claw arm, and the flywheel for the capstan as well as the optical axis of the lens system are all parallel to each other, thereby affording a high order of compactness. In a practical embodiment of my invention, in order to facilitate the change-over from the stop to the run mode and to improve the mechanical efficiency and compactness of the system, I have mounted the sprocket wheel clutch or drive, the turntable clutch or drive, the shutter and the claw arm on a common supporting plate, thereby forming a single integral unit which is readily shiftable to effect simultaneous engagement of these elements with their associated components.

While there have been shown and described preferred embodiments of cartridge-type sound motion picture projector in accordance with the invention, it will be appreciated that many changes and modifications may be made therein without, however, departing from the essential spirit of the invention as defined in the annexed claims.

What I claim is:

1. A motion picture projector system having a run mode and a stop mode, comprising a cartridge removable constituted by a turntable supporting an endless coil of film provided with image frames, sprocket holes along one edge thereof, a film gate having a window to expose said frames and a slot to expose said sprocket holes, and a double-decked sprocket wheel having an upper deck to unwind film from said turntable into said film gate and a lower deck to control the operating length of said film before permitting it to be rewound on said turntable; and a projector mechanism adapted to receive said cartridge and constituted by a claw arm operative in the run mode to enter said film gate slot to engage the film sprocket holes to advance said film intermittently one frame at a time, optical means to pass a light beam through said window to project the images on said frames, and drive means operative in the run mode to engage said double-decked sprocket wheel to run said film, the means which are operative in the run mode being disengaged from said cartridge in the stop mode to permit withdrawal of said cartridge and being movable into engagement with said cartridge in said run mode to operatively orient said claw arm relative to said film gate slot and to engage said drive means with said double-decked sprocket wheel.

2. A system as set forth in claim 1, wherein said gate lies in the horizontal plane and said film coiled on said turntable and in said sprocket wheels lies in the vertical plane and said film is twisted before entering said gate, whereby said images are projected along an optical axis normal to the plane of said cartridge.

3. A sound motion picture projector system having a run mode and a stop mode, comprising a cartridge constituted by a turntable supporting an endless coil of film provided with image frames, sprocket holes along one edge thereof and a sound track, a retractable sound carriage for extending said film outside of said cartridge in the run mode, a film gate having a window to expose said frames and a slot to expose said sprocket holes, and means including a sprocket wheel to unwind film from said turntable and to pass said film along said carriage and through said film gate before conveying said film back to said turntable to be rewound thereon; and a projector mechanism adapted to receive said cartridge and constituted by means operative in the run mode to engage and drive said sprocket wheel, pick-up means engaging the film extended in the run mode to play back the sound track thereon, means operative in the run mode for entering said slot and for engaging said sprocket holes to advance said film frame by frame, and means to project a light beam through said window optically to project said frames, the means which are operative in the run mode being disengaged from said cartridge in the stop mode to permit withdrawal of said cartridge.

4. A system as set forth in claim 1, wherein said cartridge further includes retractable loop fingers for reestablishing the dimensions of the loops in said film at the input and output sides of said gate when said system is put in the stop mode, said fingers being retracted in the run mode to free said loops.

5. A sound motion picture projector system having a run mode and a stop mode, comprising a cartridge constituted by a turntable supporting an endless coil of film provided with image frames, sprocket holes along one edge thereof and a sound track extending along the film parallel to said frames, a retractable sound carriage for extending said film outside of said cartridge in the run mode, a film gate having a window to expose said frames and a slot to expose said sprocket holes, and means including a sprocket wheel to unwind film from said turntable and to pass said film along said carriage and through said film gate before conveying said film back to said turntable to be rewound thereon; and a projector mechanism adapted to receive said cartridge and constituted by a sound pick-up head, means operative in the run mode to cause said carriage to extend said film outside of said cartridge to cause the soundtrack thereon to engage said pick-up head, a claw arm operative in the run mode to enter said film gate slot to engage the film sprocket holes and to advance said film intermittently one frame at a time, optical means to pass a light beam through said window to project the images on said frames, and drive means operative in the run mode to engage said sprocket wheel to run said film, the means which are operative in the run mode being disengaged from said cartridge in the stop mode to permit withdrawal thereof.

6. A sound motion picture projector system having a run mode and a stop mode, and comprising a cartridge constituted by a turntable supporting an endless coil of film provided with image frames, sprocket holes along one edge thereof and a sound track extending along the film parallel to the frames thereof, a retractable sound carriage for extending said film outside said cartridge in the run mode, a film gate having a window to expose said frames and a slot to expose said sprocket holes, and means including a sprocket wheel having an upper deck to unwind film from said turntable and to pass said film along said carriage and through said film gate at right angles to the position of the film in said carriage, and a lower deck to control the operating length of said film before permitting it to be rewound on said turntable; and a projector mechanism adapted to receive said cartridge and constitued by means operative in the run mode to drive said sprocket wheel, pick-up means engaging the extended film to play back the sound track thereon, means operative in the run mode entering said slot and engaging said sprocket holes to advance said film one frame at a time, and an optical assembly to project a light beam through said window optically to project said image frames along an optical axis which is parallel to the plane of said film in said turntable, the means which are operative in the run mode being disengaged from said cartridge in the stop mode to permit withdrawal thereof.

7. A projector system as set forth in claim 6, wherein said gate includes two complementary plates which are floatably mounted within said cartridge, and said projector includes rails which when said cartridge is inserted therein, lift said gate into a predetermined position relative to said optical assembly.

8. A projector system as set forth in claim 1, wherein said projector system is housed in a carrying case having a hinged cover, said optical axis is parallel to the shortest dimension of said case, further including a collapsible screen assembly provided with a reflectng mirror mounted on the inner wall of said cover in the path of said optical axis, and a translucent screen to receive the image reflected by said mirror.

9. A cartridge for a motion picture film having a series of image frames, sprocket holes along one edge thereof and a magnetic sound track extending along the film, said cartridge comprising:

(A) a rotatably mounted turntable for supporting an endless coil of said film;
(B) a double-decked sprocket wheel having an upper sprocket wheel which unwinds said film from the innermost convolution of said coil and a lower sprocket wheel which controls the length of the operating loop of said film before returning it to the outermost convolution of said coil;
(C) a retractable carriage having a roller thereon, said carriage being adapted to swing said roller outside of said cartridge;
(D) a film gate having a window to expose said image frames and a slot to expose said sprocket holes; and
(E) guide means to conduct the film drawn from the coil along said carriage roller and through the film gate.

10. A cartridge as set forth in claim 9, further including retractable loop fingers disposed to reestablish the size of loops on either side of the film gate, said fingers when retracted providing free loops.

11. In a cartridge for motion picture film, the combination of:

(A) a rotatable turntable for supporting an endless coil of film having sprocket holes along one edge thereof, and
(B) a double decked sprocket wheel having an upper sprocket which unwinds film from the innermost convolution of said coil and a lower sprocket which controls the operating length of said film before allowing it to return to the outermost convolution of said coil,
(C) and means at one end of said double-decked sprocket wheel accessible externally of said cartridge for receiving power from an external source to drive said sprocket wheel which in turn unwinds and rewinds said film.

12. A cartridge for a motion picture film having a series of image frames thereon, sprocket holes along one edge of the film and a magnetic sound track, comprising:

(A) a rectangular casing having horizontal bottom and top panels and side walls;
(B) a turntable rotatably mounted on the bottom panel and having a hub reel thereon for supporting an endless coil of said film;
(C) a double-decked sprocket wheel mounted on a shaft normal to said panels, the one wheel unwinding film from said coil and the other wheel controlling the operating length before returning the film thereto;
(D) a retractable spring-loaded carriage having a roller disposed thereon and an actuating arm whereby when said arm is pushed said roller is caused to swing outside of said cartridge through an opening in the side wall thereof;
(E) a film gate disposed in the horizontal plane and having a window to expose said image frames and a slot to expose said sprocket holes of said film; and
(F) guide means to conduct the unwound film along said carriage roller and through the film gate before the film is returned to the coil.

13. A cartridge for a motion picture film having a series of image frames and sprocket holes along one edge thereof, said cartridge comprising:

(A) a rotatably mounted turntable for supporting an endless coil of said film;
(B) a double-decked sprocket wheel having means at one end thereof accessible externaly of said cartridge for receiving power from an external source to drive said sprocket wheel which unwinds and rewinds said film;
(C) a film gate having a window to expose said image frames and a slot to expose said sprocket holes; and
(D) guide means to conduct said film from the innermost convolution on said coil to the upper deck of said sprocket wheel, through the film gate, and the lower deck of said sprocket wheel, before returning said film to the outermost convolution of said coil, said upper deck acting to unwind film from the coil and said lower deck acting to control the operating length thereof before returning the film to the coil.

14. In a cartridge as set forth in claim 13, wherein said double-decked sprocket wheel is mounted on a shaft terminating at one end in a female clutch element, whereby said wheel may be driven from an external motor source through a male clutch element engaging said female element.

15. In a cartridge as set forth in claim 13, further including a pair of retractable loop fingers disposed on either side of said film gate to control the dimensions of the free loops required on either side of the gate.

16. A cartridge for a motion picture film having a series of image frames, sprocket holes along one edge thereof and a magnetic sound track extending along the film, said cartridge comprising:

(A) a rectangular casing having horizontal bottom and top panels and side walls;
(B) a turntable rotatably mounted on the bottom panel and having a hub reel for supporting an endless coil of said film;
(C) a double-decked sprocket wheel mounted on a shaft normal to said panels;
(D) A retractable spring-loaded carriage having a roller disposed thereon and an actuating arm whereby when said arm is pushed said roller is caused to swing outside of said cartridge through an opening in the side wall thereof;
(E) a film gate floatably mounted in the horizontal plane and having a window to expose said image frames and a slot to expose said sprocket holes; and
(F) guide means to conduct said film from the innermost convolution on said coil to the upper deck of said sprocket wheel, through the film gate, along said carriage roller, and the lower deck of said sprocket wheel before returning said film to the outermost convolution of said coil, said film being positioned in the vertical plane along said sprocket wheels and being twisted into the horizontal plane when passing through said gate.

17. The combination with a sound motion picture projector of a cartridge receivable within said projector, said projector and cartridge including a lens, a shutter, a capstan and a drive sprocket to drive film wherein the axes of said lens, shutter, capstan and drive sprocket are substantially parallel.

18. The combination according to claim 17 wherein said lens, shutter and capstan are part of said projector, and said sprocket is part of and removable with said cartridge.

19. In a cartridge loaded sound motion picture projector having a run mode and a stop mode and a cartridge-receiving chamber, the cartridge receivable within said cartridge-receiving chamber and including a turntable for an endless film, having film perforations, a sprocket to drive the film, a gate to block all of the film except the frame being projected, and a pivoted sound carriage to extend the film externally of said cartridge, the projector further including a sprocket drive, a claw for frame by frame advance of the film through said gate, and sound-reproducing means; and control means for moving said sprocket drive into operative relation with said sprocket, said claw into operative relation with said film gate, and said sound carriage into operative relation with said sound-reproducing means in the run mode of said projector, said control means being further constructed and arranged to move said sprocket drive, said claw and said sound carriage out of operative relation with their respectively co-operating sprocket, film gate, and sound-reproducing means in the stop mode of said projector whereby said cartridge may be removed.

20. In a cartridge loaded sound motion picture projector according to claim 19, said turntable, said sprocket, and said pivoted sound carriage being arranged such that their respective axes are parallel.

21. In a cartridge loaded sound motion picture projector according to claim 20, said projector including a projection lens and a shutter, said projection lens and said shutter being arranged with their axes parallel to the axes of said turntable, sprocket and pivoted sound carriage.

22. A motion picture projector comprising a cartridge-receiving chamber and a removable film cartridge adapted to receive an endless coil of film having a sound track thereon and insertable into and withdrawable from said cartridge-receiving chamber, said cartridge including a rotatable film transport means for unwinding and rewinding film from said endless coil and a film gate through which successive frames of said endless coil are advanced for projection, the improvement comprising said projector including a shiftable film transport drive adapted to operatively engage said said film transport means of said cartridge, a shiftable film feeder adapted to engage said film for frame by frame advance thereof through said film gate, a shutter mechanism coacting with said film gate for frame by frame projection of successive frames of said film, means for shifting said film transport drive and said film feeder into engagement with said film transport means and said film respectively when said film cartridge is in said cartridge-receiving chamber, sound-reproducing means external to said film cartridge and means operable when said film cartridge in said cartridge-receiving chamber for orienting said film external to said film cartridge and in sound-reproducing relation to said sound-reproducing means.

23. A motion picture projector according to claim 22 including a projection lens and wherein said film gate is in a plane substantially at right angles to the axis of said film transport means.

24. A cartridge for motion picture film comprising a casing, a turntable rotatably mounted on said casing for turning movement about a turntable axis for supporting an endless coil of said film having a closed loop emanating from the inner convolution of said coil and returning to the outer convolution thereof, film-transport and guide means within said cartridge and adapted to engage said film to unwind the same at said inner convolution, pass said film along a prescribed course and return said film at said outer convolution, a film gate along said course and defining a film guide extending in a plane substantially at right angles to said turntable axis and through which said film passes, and film-distending means along said course and movable outwardly relative thereto to distend said film to a sound-pickup location external to said casing.

25. A cartridge for motion picture film comprising a casing, a turntable rotatably mounted on said casing for turning movement about a turntable axis for supporting an endless coil of said film having a closed loop emanating frm the inner convolution of said coil and returning to the outer convolution thereof, film-transport and guide means within said cartridge and adapted to engage said film to unwind the same at said inner convolution, pass said film along a prescribed course about the perimeter of said casing and return said film at said outer convolution, a film gate along said course and defining a film gate extending in a plane substantially at right angles to said turntable axis and through which said film passes, loop-adjusting means for adjusting said closed loop in relation to said film gate and film-distending means along said course in trailing relation to said film gate and movable outwardly relative to said course to distend said film to a sound-pickup location external to said casing.

26. A cartridge for motion picture film comprising a casing, a turntable rotatably mounted on said casing for turning movement about a turntable axis for supporting an endless coil of said film having a closed loop emanating from the inner convolution of said coil and returning to the outer convolutions thereof, film-transport and guide means within said cartridge and adapted to engage said film to unwind the same at said inner convolution, pass said film along a prescribed course about the perimeter of said casing and return said film at said outer convolution, a film gate along said course and defining a film guide extending in a plane at right angles to said turntable axis and through which said film passes, loop-adjusting means including fingers disposed in leading and trailing relation to said film gate for adjusting said closed loop in relation to said film gate and film-distending means along said course in trailing relation to said film gate including a distending member and means movably mounting said distending member for movement outwardly relative to said course to distend said film to a sound-pickup location external to said casing.

27. In a cartridge-loaded motion picture projector having a run mode and a stop mode, a removable cartridge including a turntable adapted to support an endless coil of film, film-transport means within said cartridge to unwind film from said turntable, pass the film along a prescribed course through said cartridge and return the film to said turntable, a film gate along said course, said projector comprising a cartridge-receiving chamber adapted to receive said cartridge, drive mechanisms including a turntable drive external to said chamber and shiftable into driving engagement with said turntable and a transport drive external to said chamber and shiftable into driving engagement with said film-transport means, a film claw external to said chamber and shiftable into an operative position relative to said film gate and control means operable when said cartridge is in said chamber for shifting said turntable and transport drives into engagement with said turntable and film-transport means respectively and for shifting said film claw into said operative position.

28. In a cartridge-loaded motion picture projector having a run mode and a stop mode, a removable cartridge including a turntable adapted to support an endless coil of film provided with a sound track, film-transport means within said cartridge to unwind film from said turntable, pass the film along a prescribed course through said cartridge and return the film to said turntable, a film gate along said course, film-distending means along said course, said projector comprising a cartridge-receiving chamber adapted to receive said cartridge, drive mechanisms including a turntable drive external to said chamber and shiftable into driving engagement with said turntable and a transport drive external to said chamber and shiftable into driving engagement with said film-transport means, a film claw external to said chamber and shiftable into an operative position relative to said film gate, a sound pickup head external to said chamber and control means operable when said cartridge is in said chamber for shifting said turntable and transport drives into engagement with said turntable and film-transport means respectively, for shifting said film claw into said operative position and for actuating said film-distending means to orient said film external to said cartridge and in sound reproducing relation to said pickup head.

29. In a cartridge-loaded motion picture projector having a run mode and a stop mode, a removable cartridge including a turntable adapted to support an endless coil of film provided with image frames and sprocket holes, film-transport means within said cartridge to unwind film from said turntable, pass the film in an endless loop along a prescribed course through said cartridge and return the film to said turntable, a film gate along said course, loop-forming means along said course and adapted to engage said film for establishing free loops before and after said film gate, said projector comprising a cartridge-receiving chamber adapted to receive said cartridge, drive mechanisms including a turntable drive external to said chamber and shiftable into driving engagement with said turntable and a transport drive external to said chamber and shiftable into driving engagement with said film-transport means, a film claw external to said chamber and shiftable into an operative position relative to said film gate to engage said sprocket holes for the frame by frame advance of said film, and control means operable when said cartridge is in said chamber for shifting said turntable and transport drives into engagement with said turntable and film-transport means respectively, for shifting said film claw into said operative position and for retracting said loop-forming means from said course.

30. In a cartridge-loaded motion picture projector having a run mode and a stop mode, a removable cartridge including a turn table adapted to support an endless coil of film provided with image frames, sprocket holes and a sound track, film-transport means within said cartridge to unwind film from said turntable, pass the film in an endless loop along a prescribed course through said cartridge and return the film to said turntable, a film gate along said course, loop-forming means along said course and adapted to engage said film for establishing free loops before and after said film gate, film-distending means along said course, said projector comprising a cartridge-receiving chamber adapted to receive said cartridge, drive mechanisms including a turntable drive external to said chamber and shiftable into driving engagement with said turntable and a transport drive external to said chamber and shiftable into driving engagement with said film-transport means, a film claw external to said chamber and shiftable into an operative position relative to said film gate to engage said sprocket holes for the frame by frame advance of said film, a sound pickup head external to said chamber and control means operable when said cartridge is in said chamber for shifting said turntable and transport drives into engagement with said turntable and film-transport means respectively, for shifting said film claw into said operative position, for retracting said loop-forming means from said course and for actuating said film-distending means to orient said film external to said cartridge and in sound-reproducing relation to said pickup head.

References Cited

UNITED STATES PATENTS

| | | | |
|---|---|---|---|
| 1,463,620 | 7/1923 | Larson et al. | 352—128 |
| 3,244,470 | 4/1966 | Hennessey et al. | 352—29 |
| 3,284,155 | 11/1966 | Jensen et al. | 352—29 |
| 2,238,719 | 4/1941 | De Tartas | 352—72 |
| 2,279,022 | 4/1942 | Duskes | 352—128 |
| 2,434,200 | 1/1948 | Engleken | 352—8 |
| 2,624,232 | 1/1953 | Kingston | 352—83 |

FOREIGN PATENTS

| | | |
|---|---|---|
| 924,195 | 4/1963 | Great Britain. |

JULIA E. COINER, *Primary Examiner.*